US012686351B2

(12) United States Patent
Barbat et al.

(10) Patent No.: US 12,686,351 B2
(45) Date of Patent: Jul. 21, 2026

(54) VEHICLE BUMPER

(71) Applicant: Ford Global Technologies, LLC, Dearborn, MI (US)

(72) Inventors: Saeed D. Barbat, Novi, MI (US); Mohammad Omar Faruque, Ann Arbor, MI (US); Dean M. Jaradi, Macomb, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 18/459,897

(22) Filed: Sep. 1, 2023

(65) Prior Publication Data

US 2025/0074346 A1     Mar. 6, 2025

(51) Int. Cl.
| | |
|---|---|
| B60R 19/18 | (2006.01) |
| B60R 19/26 | (2006.01) |
| B60R 19/34 | (2006.01) |

(52) U.S. Cl.
CPC .............. B60R 19/18 (2013.01); B60R 19/34 (2013.01); *B60R 2019/1866* (2013.01); *B60R 2019/264* (2013.01)

(58) Field of Classification Search
CPC ... B60R 19/34; B60R 19/18; B60R 2019/182; B60R 2019/1806; B60R 2019/1846; B60R 2019/186; B60R 2019/1866; B60R 2019/264
USPC ........ 293/102, 120, 122, 130; 188/371, 374, 188/376, 377
See application file for complete search history.

(56) References Cited

U.S. PATENT DOCUMENTS

| | | | | |
|---|---|---|---|---|
| 3,852,150 | A * | 12/1974 | Weller ................ | B29C 44/1266 52/716.5 |
| 6,340,186 | B2 * | 1/2002 | Johnson .................... | B60R 9/00 293/120 |
| 6,416,094 | B1 * | 7/2002 | Cherry .................... | B60R 19/18 293/120 |
| 6,547,294 | B2 * | 4/2003 | Yamamoto ............... | B62J 23/00 296/187.12 |

(Continued)

FOREIGN PATENT DOCUMENTS

FR            2810941 A1 *   1/2002   ............. B60R 19/18

OTHER PUBLICATIONS

DE 102018130419 and computer translation (Year: 2020).*

*Primary Examiner* — Gregory A Blankenship
(74) *Attorney, Agent, or Firm* — Frank A. MacKenzie; Brooks Kushman P.C.

(57) ABSTRACT

A bumper for a vehicle includes a crossbeam, a first crush can, and a second crush can. The first crush can extends vehicle-rearward from the crossbeam to the first frame rail along the vehicle-longitudinal axis and the second crush can extend vehicle-rearward from the crossbeam to the second frame rail along the vehicle-longitudinal axis. The bumper has a topmost surface along the crossbeam, the first crush can, and the second crush can. The bumper has a bottommost surface along the crossbeam, the first crush can, and the second crush can. The crossbeam, the first crush can, and the second crush can have a lattice shape defining cells. At least some of the cells are elongated through both the topmost surface and the bottommost surface. The crossbeam, the first crush can, and the second crush can are unitary with each other.

17 Claims, 9 Drawing Sheets

(56) References Cited

U.S. PATENT DOCUMENTS

| | | | |
|---|---|---|---|
| 6,712,410 B2* | 3/2004 | Kudelko | B60R 19/18 293/120 |
| 7,044,515 B2 | 5/2006 | Mooijman et al. | |
| 7,959,197 B2 | 6/2011 | Agrahari et al. | |
| 8,042,847 B2* | 10/2011 | Garg | B60R 19/18 296/187.04 |
| 8,430,437 B2 | 4/2013 | Asakawa et al. | |
| 9,228,628 B2 | 1/2016 | Alavandi et al. | |
| 9,233,658 B2 | 1/2016 | Kale et al. | |
| 9,840,219 B2* | 12/2017 | Theethira Kushalappa | B60R 19/56 |
| 10,486,745 B1* | 11/2019 | Kim | B60R 19/18 |
| 10,507,776 B2* | 12/2019 | Newcomb | B60R 19/03 |
| 11,338,749 B2* | 5/2022 | Wright | B60R 19/18 |
| 2006/0181090 A1* | 8/2006 | Boivin | B60R 19/18 293/146 |
| 2006/0237976 A1* | 10/2006 | Glasgow | B21C 37/18 293/132 |
| 2011/0025080 A1* | 2/2011 | Anand | B60R 19/00 293/102 |
| 2011/0101714 A1* | 5/2011 | Bator | F16F 7/121 29/428 |
| 2011/0309653 A1* | 12/2011 | Schuler | B60R 19/18 296/187.03 |
| 2012/0104775 A1* | 5/2012 | Marur | B60R 19/34 264/261 |
| 2012/0104778 A1* | 5/2012 | Mana | B60R 19/18 264/269 |
| 2014/0333077 A1* | 11/2014 | Kil | B60R 19/03 293/132 |
| 2015/0076847 A1* | 3/2015 | Mori | B62D 21/152 293/154 |
| 2015/0197214 A1* | 7/2015 | Marur | B60R 21/34 29/428 |
| 2016/0001722 A1* | 1/2016 | Nickel | B60R 19/03 293/120 |
| 2016/0089817 A1* | 3/2016 | Hundley | B29C 35/0894 264/496 |
| 2017/0001586 A1* | 1/2017 | Ashraf | B60R 19/34 |
| 2017/0106822 A1* | 4/2017 | Steinebach | B23K 31/02 |
| 2017/0136970 A1* | 5/2017 | Steinebach | B60R 19/03 |
| 2017/0144618 A1* | 5/2017 | Martini | B60R 19/03 |
| 2017/0217393 A1* | 8/2017 | Mohapatra | F16F 7/12 |
| 2017/0327065 A1* | 11/2017 | So | F16F 7/12 |
| 2018/0037179 A1* | 2/2018 | Steinebach | B60R 19/34 |
| 2018/0186984 A1* | 7/2018 | Kim | B60R 19/03 |
| 2018/0215331 A1* | 8/2018 | Gumpina | B60R 19/18 |
| 2018/0265023 A1* | 9/2018 | Faruque | F16F 7/121 |
| 2019/0039541 A1* | 2/2019 | Tyan | B60R 21/04 |
| 2019/0168701 A1* | 6/2019 | Schijve | B60R 21/34 |
| 2019/0359019 A1* | 11/2019 | Khandelwal | B60D 1/565 |
| 2020/0262371 A1* | 8/2020 | Patberg | B60R 19/03 |
| 2021/0031712 A1* | 2/2021 | Patterson | B62D 21/152 |
| 2021/0155180 A1* | 5/2021 | Faruque | B33Y 80/00 |
| 2021/0380056 A1* | 12/2021 | Gunaydin | B60R 19/18 |
| 2021/0380057 A1* | 12/2021 | Heilmann | B60R 19/04 |
| 2022/0105886 A1* | 4/2022 | Park | B60R 19/04 |
| 2022/0324401 A1* | 10/2022 | Laxman | B60R 19/18 |
| 2023/0415687 A1* | 12/2023 | Baccouche | B60R 19/34 |
| 2025/0074346 A1* | 3/2025 | Barbat | B60R 19/18 |

* cited by examiner

VEHICLE BUMPER

BACKGROUND

Vehicles are subject to a variety of impact tests for different types of collisions. During certain vehicle impacts, e.g., certain offset frontal impacts of a vehicle, the direction the impact is offset from major structural components of the vehicle. Offset front impacts can be simulated with standardized tests like small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier. In this frontal offset impact mode, various suspension and steering components will move with one another as deformation progresses.

As another example, angular vehicle impacts may urge the occupant forward and may urge the shoulders of the occupant to twist. In one example, a test procedure simulates an impact of a test vehicle from another vehicle at an oblique angle with the use of a moving deformable barrier.

DETAILED DESCRIPTION

Figure 1:
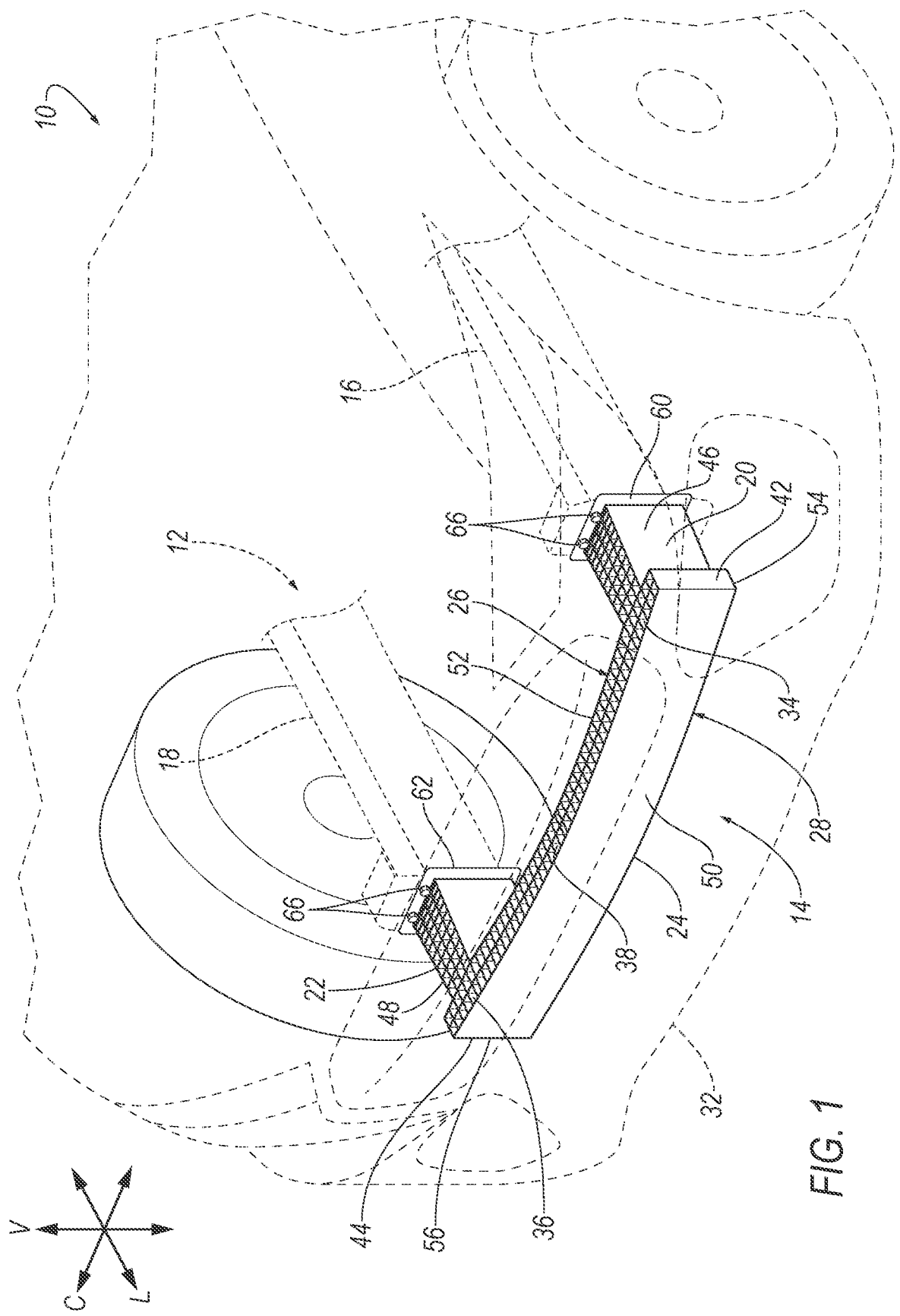
FIG. 1 is a perspective view of a vehicle including an example of a bumper.

A vehicle includes a vehicle frame including a first frame rail and a second frame rail each elongated along a vehicle-longitudinal axis. The vehicle includes a bumper supported by the first frame rail and the second frame rail. The bumper includes a crossbeam elongated cross-vehicle. The bumper includes a first crush can and a second crush can. The first crush can extends vehicle-rearward from the crossbeam to the first frame rail along the vehicle-longitudinal axis and the second crush can extends vehicle-rearward from the crossbeam to the second frame rail along the vehicle-longitudinal axis. The bumper has a topmost surface along the crossbeam, the first crush can, and the second crush can and a bottommost surface along the crossbeam, the first crush can, and the second crush can. The crossbeam, the first crush can, and the second crush can have a lattice shape defining cells, at least some of the cells being elongated through both the topmost surface and the bottommost surface. The crossbeam, the first crush can, and the second crush can are unitary with each other.

At least a portion of the first crush can and the second crush can may increase in stiffness along a direction from the crossbeam toward the frame rail.

The first crush can and the second crush can each may continuously increase in stiffness from the crossbeam to the frame rail.

A periphery of the first crush can and a periphery of the second crush can may each narrow from the crossbeam to the frame rail.

A periphery of the first crush can and a periphery of the second crush can may each widen from the crossbeam to the frame rail.

The lattice shape has walls bounding the cells and, in at least a portion of the lattice shape, the walls increase in thickness in a direction from the crossbeam toward the frame rail. In at least the portion of the lattice shape, successive ones of the cells may decrease in size in the direction from the crossbeam toward the frame rail. A periphery of the first crush can and a periphery of the second crush can may each narrow from the crossbeam to the frame rail. A periphery of the first crush can and a periphery of the second crush can may each widen from the crossbeam to the frame rail.

The lattice shape may have a repeating pattern that continues from the crossbeam to the first crush and from the crossbeam to the second crush can. The crossbeam may extend cross-vehicle between a first outermost surface and a outermost surface. The first crush can may have an outermost surface extending from the first outermost surface of the crossbeam toward the first frame rail. The second crush can may have an outermost surface extending from the second outermost surface of the crossbeam toward the second frame rail. The bumper may include a first flange extending radially from the first crush can and a second flange extending radially from the second crush can. The first flange may abut the first frame rail and the second flange may abut the second frame rail. The first flange may be unitary with the first crush can and the second flange may be unitary with the second crush can. The vehicle may include fasteners extending through the first flange into the first frame rail and fasteners extending through the second flange to into the second frame rail.

The lattice shape may have walls bounding the cells, in at least a portion of the lattice shape, successive ones of the cells decrease in size in a direction from the crossbeam toward the frame rail.

The bumper may include a first flange extending radially from the first crush can and a second flange extending radially from the second crush can. The first flange may abut the first frame rail and the second flange may abut the second frame rail. The vehicle may include fasteners extending through the first flange into the first frame rail and fasteners extending through the second flange to into the second frame rail. The first flange may be unitary with the first crush can and the second flange may be unitary with the second crush can.

The crossbeam, the first crush can, and the second crush can may be extruded aluminum.

The lattice shape may have a repeating pattern that continues from the crossbeam to the first crush and from the crossbeam to the second crush can.

The vehicle may include a fascia supported by the vehicle frame and including a class-A surface. The bumper may be between the fascia and the vehicle frame.

With reference to the Figures, wherein like numerals indicate like parts throughout the several views, a vehicle 10 includes a vehicle frame 12 and a bumper 14. The vehicle frame 12 includes a first frame rail 16 and a second frame rail 18 each elongated along a vehicle-longitudinal axis L. The bumper 14 is supported by the first frame rail 16 and the second frame rail 18. The bumper 14 includes a crossbeam 24 elongated cross-vehicle. The bumper 14 includes a first crush can 20 and a second crush can 22. The first crush can 20 extends vehicle-rearward from the crossbeam 24 to the first frame rail 16 along the vehicle-longitudinal axis L and the second crush can 22 extend vehicle-rearward from the crossbeam 24 to the second frame rail 18 along the vehicle-longitudinal axis L. The bumper 14 has a topmost surface 26 along the crossbeam 24, the first crush can 20, and the second crush can 22. The bumper 14 has a bottommost surface 28 along the crossbeam 24, the first crush can 20, and the second crush can 22. The crossbeam 24, the first crush can 20, and the second crush can 22 have a lattice shape defining cells 30. At least some of the cells 30 are elongated through both the topmost surface 26 and the bottommost surface 28. The crossbeam 24, the first crush can 20, and the second crush can 22 are unitary with each other. Since the crossbeam 24, the first crush can 20, and the second crush can 22 are unitary with each other, manufacturing, tooling, and assembly of the bumper 14 is simplified. The cells 30 reduce overall weight of the bumper 14.

Figure 2:
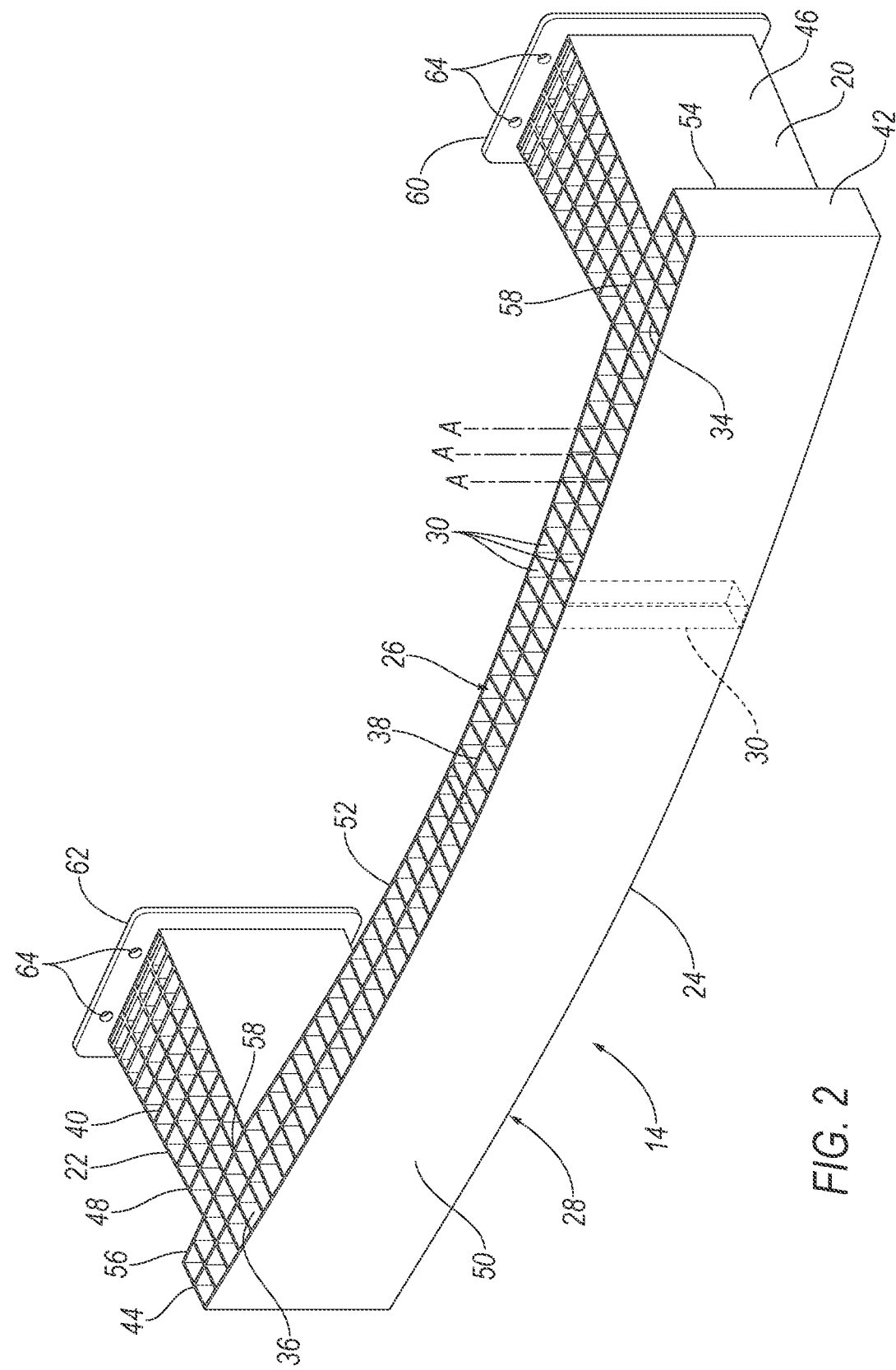
FIG. 2 is a perspective view of the example bumper of FIG. 1.
Figure 3:
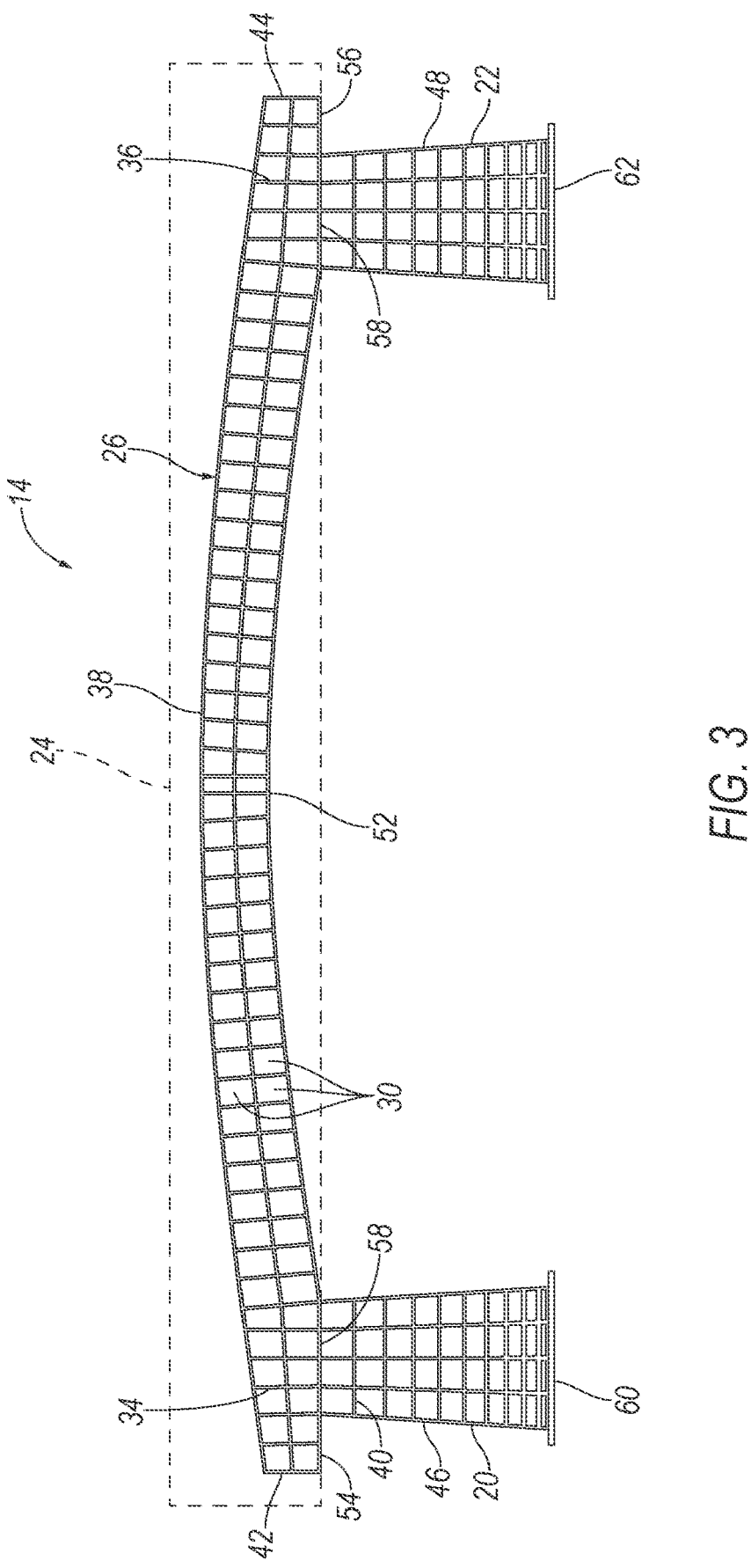
FIG. 3 is a top view of the example bumper of FIG. 1.
Figure 4:
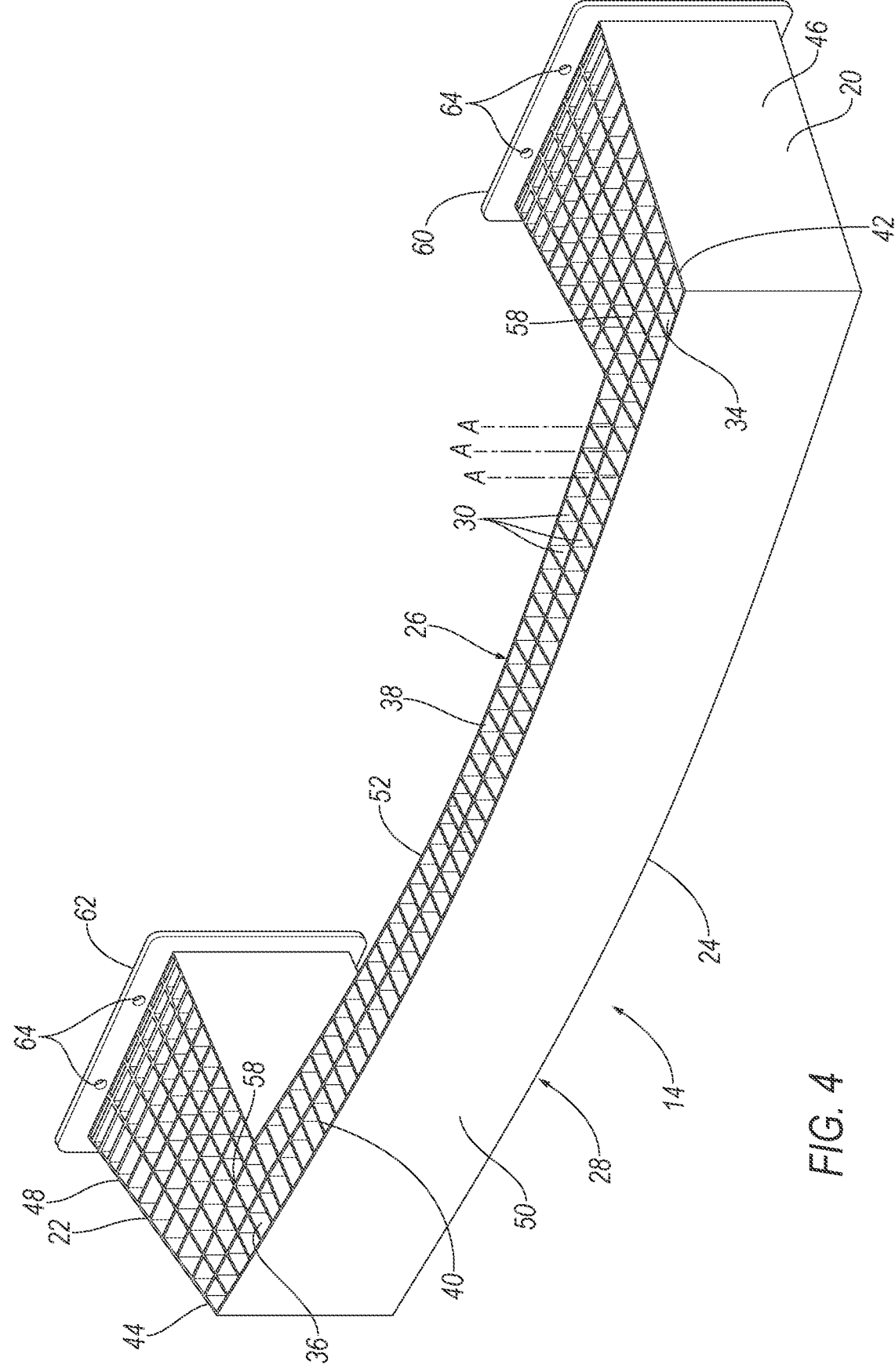
FIG. 4 is a perspective view of a second example bumper.
Figure 5:
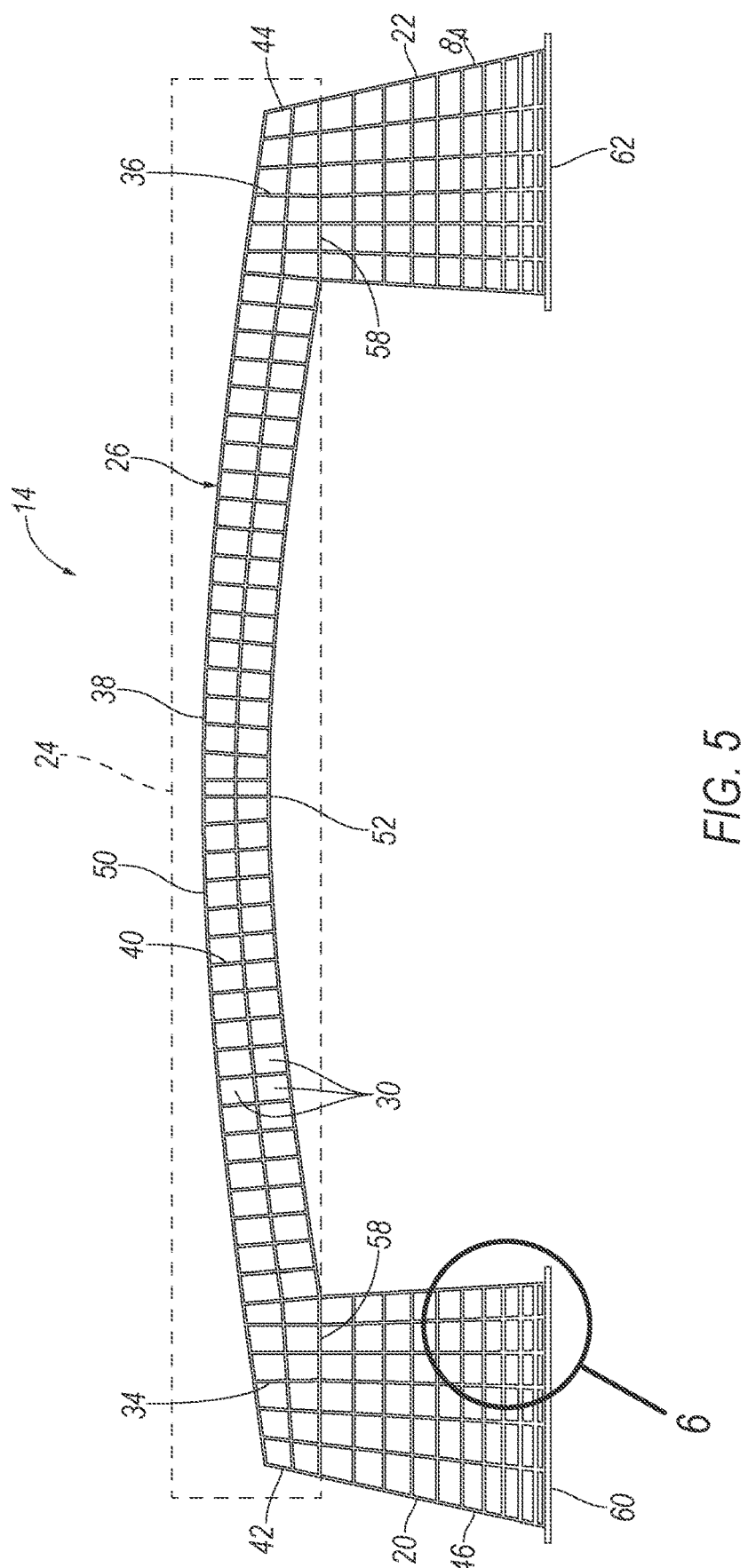
FIG. 5 is a top view of the example bumper of FIG. 4.
Figure 6:
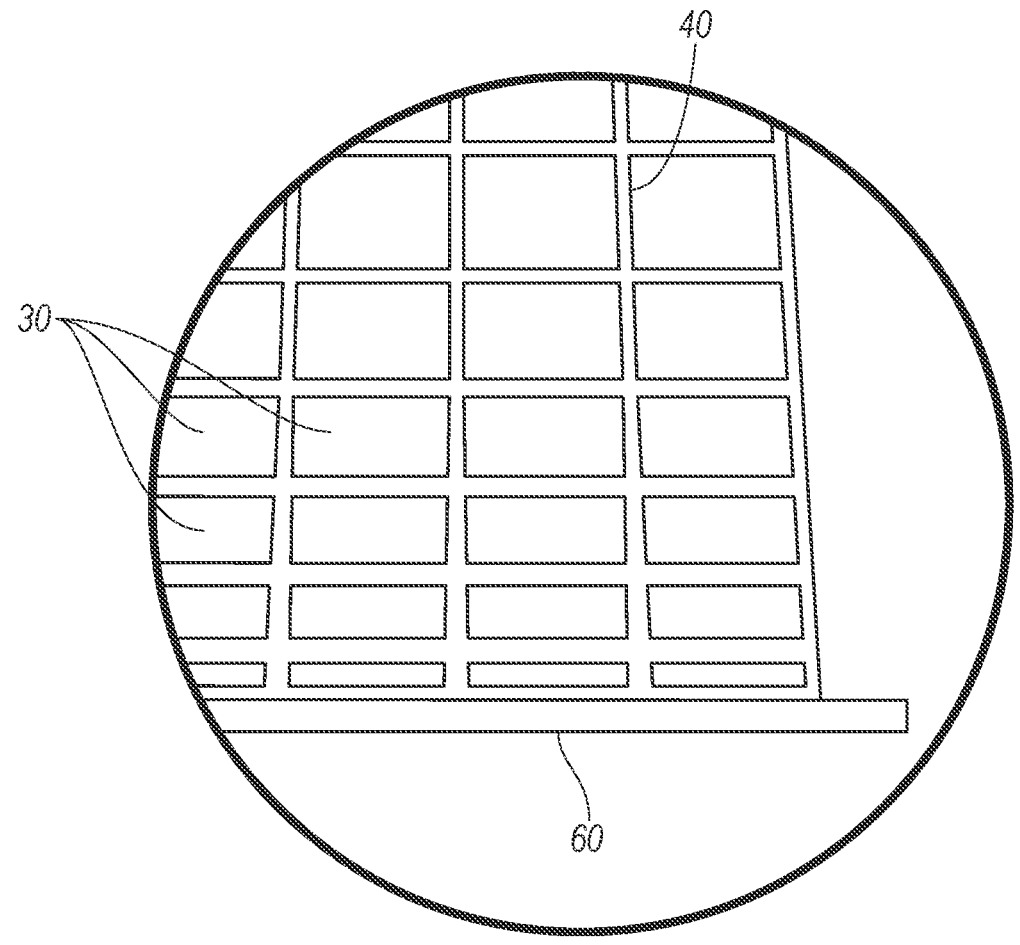
FIG. 6 is a magnified view of a portion of FIG. 5.
Figure 7:
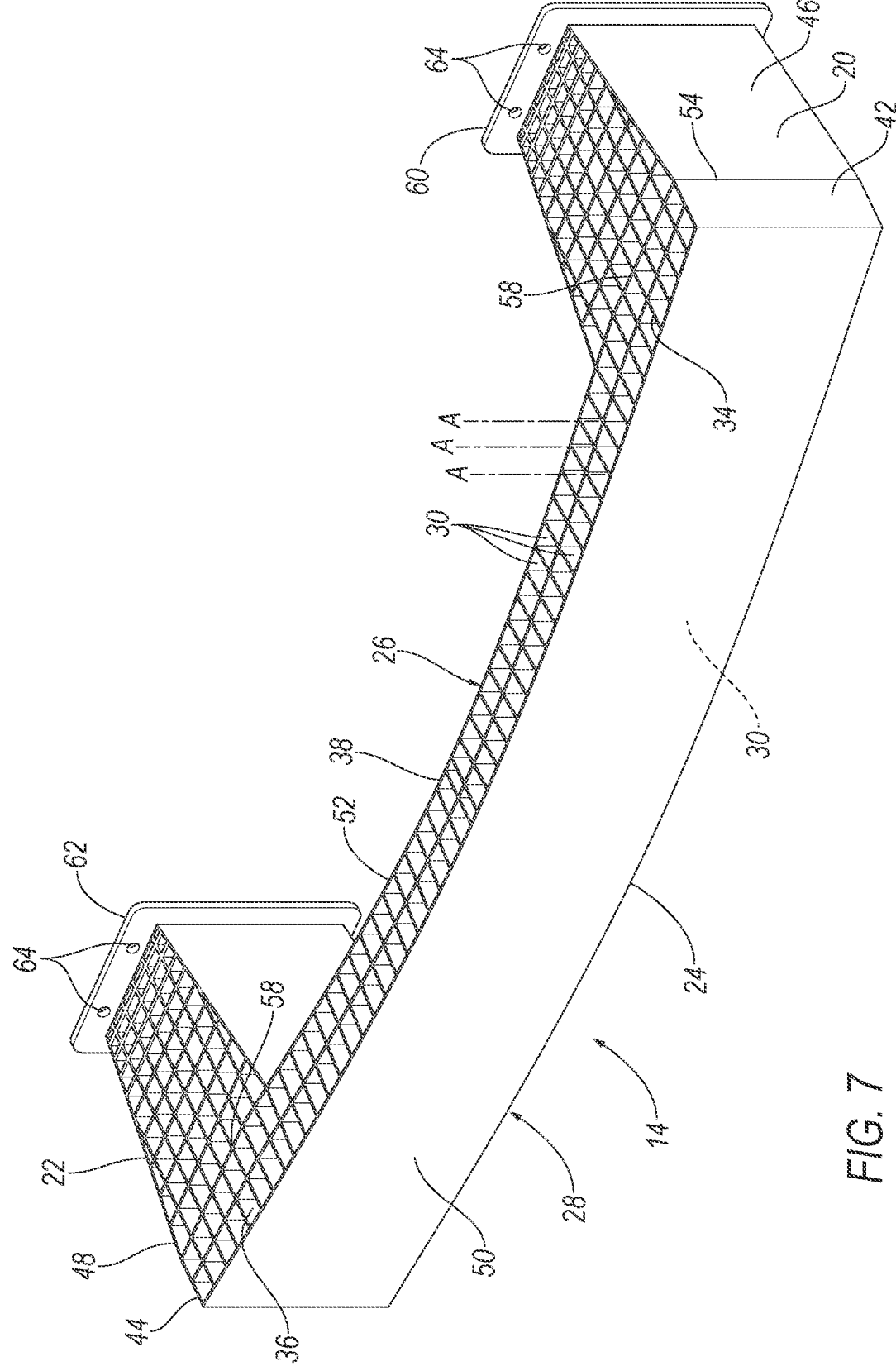
FIG. 7 is a perspective view of a third example bumper.
Figure 8:
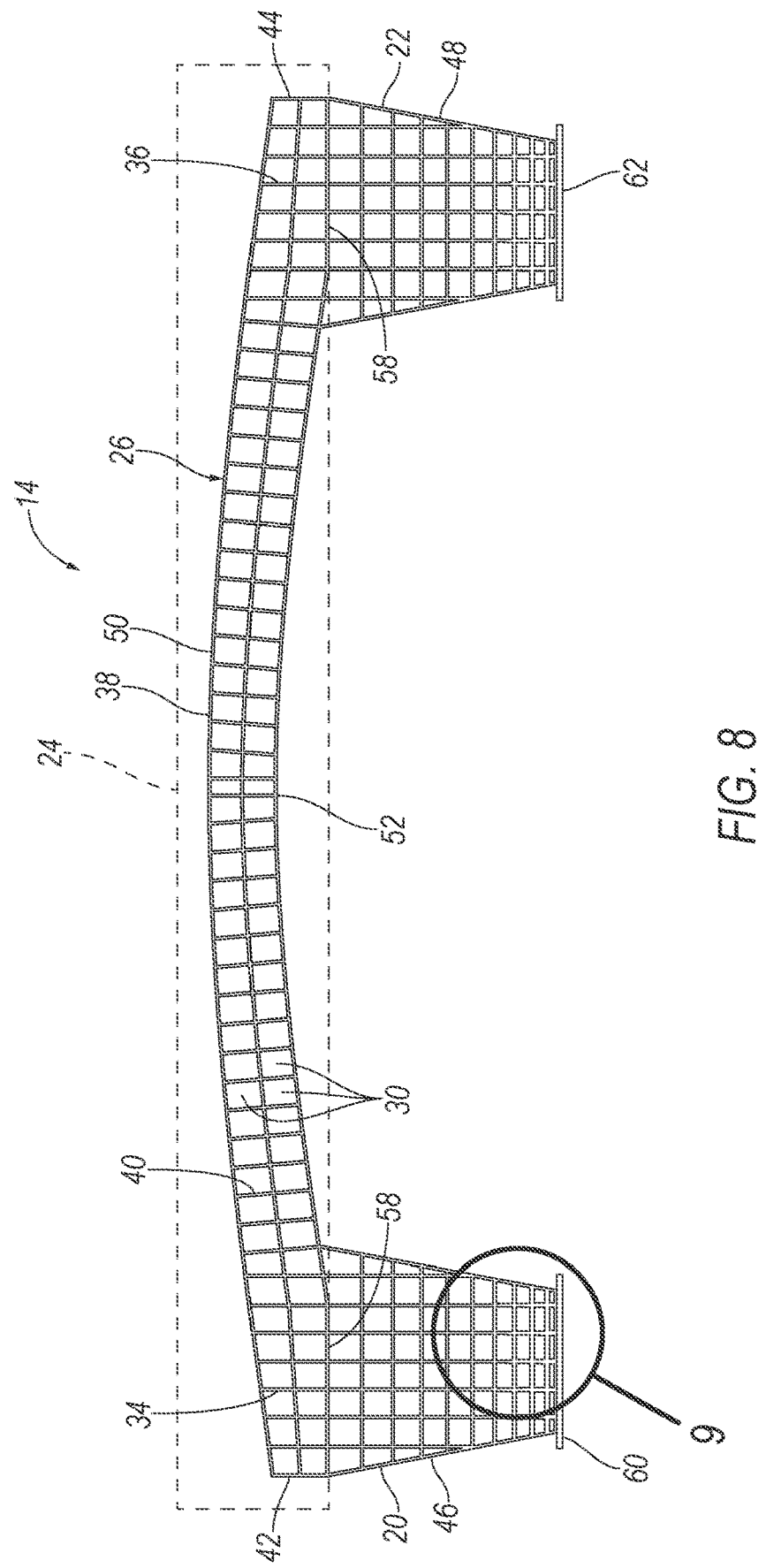
FIG. 8 is a top view of the example bumper of FIG. 7.
Figure 9:
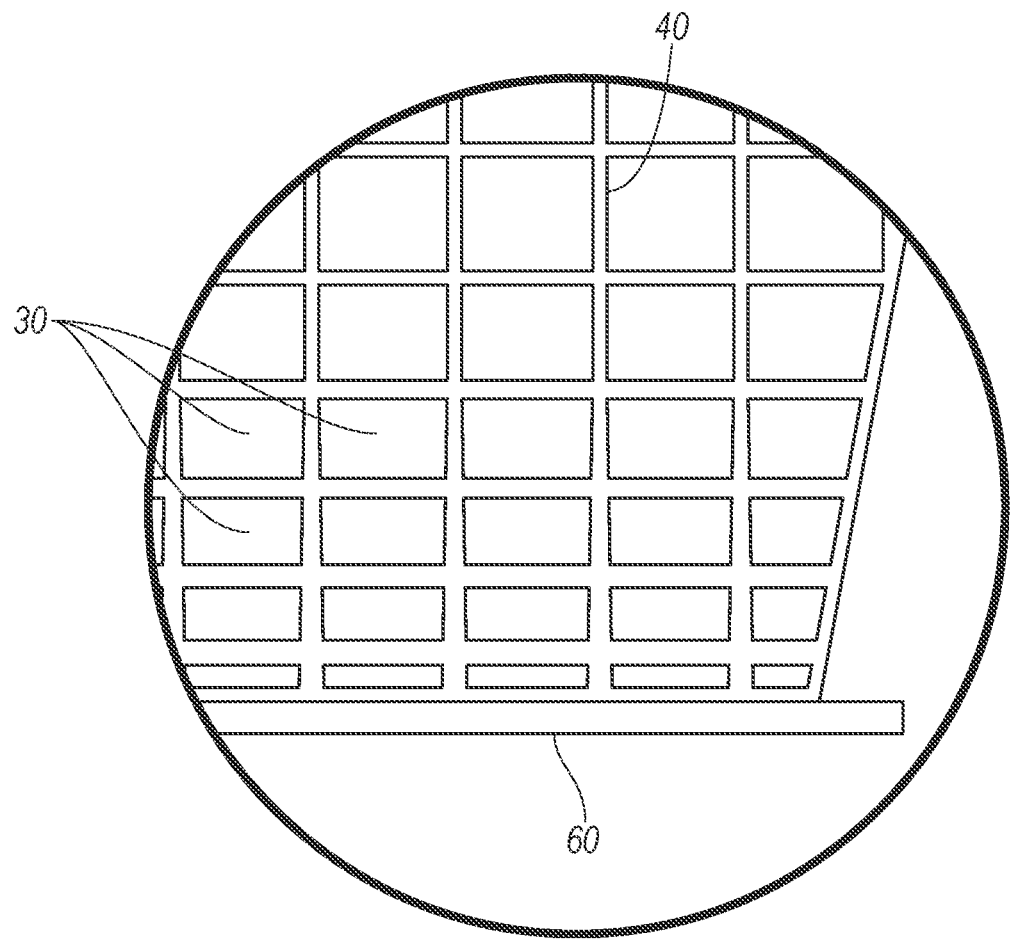
FIG. 9 is a magnified view of a portion of FIG. 7.

By way of example, three examples of the bumper 14 are shown in the Figures, specifically, one example is in FIGS. 1-3, another example is shown in FIGS. 4-6, and another example is shown in FIGS. 7-9. The three examples are described in further detail below. Common numerals are used to identify common features of the various examples.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. With reference to FIG. 1, the vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

With reference to FIG. 1, the vehicle 10 includes a vehicle frame 12 and a vehicle body (not numbered). The vehicle body and the vehicle frame 12 may have a body-on-frame construction (also referred to as a cab-on-frame construction) in which the vehicle body and vehicle frame 12 are separate components, i.e., are modular, and the vehicle body is supported on and affixed to the vehicle frame 12, e.g., the first frame rail 16 and the second frame rail 18. As another example, the vehicle body and the vehicle frame 12 may be of a unibody construction in which the vehicle frame 12 is unitary with the vehicle body (including the first frame rail 16, the second frame rail 18, pillars, roof rails, etc.). In other examples, the vehicle frame 12 and vehicle body may have any suitable construction. The vehicle frame 12 and vehicle body may be of any suitable material, for example, steel, aluminum, and/or fiber-reinforced plastic, etc.

The vehicle body includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle body may define a passenger cabin to house occupants of the vehicle 10.

The vehicle frame 12 includes the first frame rail 16 and the second frame rail 18 and may include cross beams. The first frame rail 16 and the second frame rail 18 are elongated along the vehicle-longitudinal axis L. The first frame rail 16 and the second frame rail 18 are spaced from each other cross-vehicle, i.e., along the cross-vehicle axis C. The cross beams of the vehicle frame 12 extend from the first frame rail 16 to the second frame rail 18 transverse to the vehicle-longitudinal axis A.

With continued reference to FIG. 1, the first frame rail 16 and the second frame rail 18 may define the cross-vehicle boundaries of the vehicle frame 12. The first frame rail 16 and the second frame rail 18 may be elongated along the vehicle-longitudinal axis L from a rear end of the vehicle 10 to a front end of the vehicle 10. In some examples, the first frame rail 16 and the second frame rail 18 may extend along substantially the entire length of the vehicle 10. In other examples, the first frame rail 16 and the second frame rail 18 may be segmented and extend under portions of the vehicle 10, e.g., at least extending from below a passenger compartment of the vehicle 10 to the front end of the vehicle 10. In some examples, the first frame rail 16 and the second frame rail 18 each may be unitary from the rear end of the vehicle 10 to the front end of the vehicle 10. In other examples, the first frame rail 16 and the second frame rail 18, respectively, may each include segments fixed to each other (e.g., by welding, threaded fastener, etc.) and in combination extending from a rear end of the vehicle 10 to the front end of the vehicle 10.

As set forth above, the vehicle frame 12 may have a body-on-frame construction in which the vehicle body is supported on and affixed to the vehicle frame 12. In such an example, the first frame rail 16 and the second frame rail 18 may each include cab mount brackets (not shown) on which the vehicle body is supported and affixed. The cab mount brackets are fixed to the first frame rail 16 and the second frame rail 18, e.g., welded to the first frame rail 16 and the second frame rail 18. The cab mount brackets may extend outboard from the respective first frame rail 16 and the second frame rail 18. The cab mount bracket may be cantilevered from the respective first frame rail 16 and the second frame rail 18. The cab mount brackets are configured to support the vehicle body in a body-on-frame configuration. For example, the cab mount bracket may include a post or a hole that receives a hole or a post, respectively, of the vehicle body to connect the vehicle body to the vehicle frame 12. Specifically, the vehicle body may be fixed to the cab mount bracket. During assembly of the vehicle 10, the vehicle body is set on the vehicle frame 12 with fastening features of the vehicle body aligned with the cab mount brackets for engagement with the cab mount brackets.

The vehicle frame 12 may include suspension and steering attachment points (not shown) that support suspension and steering components of the vehicle 10. As one example, the suspension and steering attachment points may be suspension towers. Suspension and steering components of the vehicle 10 are connected to the vehicle frame 12, at least in part, at the suspension towers. The suspension and steering components include suspension shocks, suspension struts, steering arms, steering knuckles, vehicle wheels, etc.

With reference to FIG. 1, the vehicle 10 has a front-end structure. The front-end structure includes a grill and the bumper 14. The grill is above the bumper 14. The grill may be a component of the vehicle body and may be supported on other components of the vehicle body.

The vehicle body includes a fascia 32. The fascia 32 may be a component of the front-end structure. The fascia 32 is supported by the vehicle frame 12, i.e., the weight of the fascia 32 may be borne by the frame. Specifically, the fascia 32 may be connected directly to the vehicle frame 12 and/or may be connected directly to the vehicle body and supported indirectly by the vehicle frame 12 through another component of the vehicle body. The bumper 14 is between the fascia 32 and the vehicle frame 12. The fascia 32 includes a class-A surface, i.e., a finished surface exposed to view by a customer and free of unaesthetic blemishes and defects.

The first crush can 20 and the second crush can 22 may be elongated along the vehicle-longitudinal axis L. For example, the first crush can 20 may be coaxial with the first frame rail 16 and the second crush can 22 may be coaxial with the second frame rail 18.

The first crush can 20 and the second crush can 22 are designed to deform relative to the first frame rail 16 and the second frame rail 18 during frontal-vehicle impact. Specifically, the first crush can 20 and the second crush can 22 deform vehicle-rearward to allow rearward movement of the crossbeam 24 of the bumper 14 relative to the first frame rail 16 and the second frame rail 18 to absorb energy during certain vehicle impacts. The first crush can 20 and the second crush can 22 may include features that direct deformation of the first crush can 20 and the second crush can 22 toward the first frame rail 16 and the second frame rail 18 during certain frontal impacts of the bumper 14. These features may include wall 40 geometry, wall 40 thickness, dimples, cutouts, lattice geometry, etc. As described further below, during certain vehicle impacts, the crossbeam 24 may transmit impact force to the first crush can 20 and/or the second crush can 22 and/or the crossbeam 24 may deform.

The bumper 14 is elongated along cross-vehicle, i.e., along the cross-vehicle direction C. The crossbeam 24 is elongated cross-vehicle. In other words, the longest dimension of the crossbeam 24 is along the cross-vehicle axis C. The crossbeam 24 is elongated transversely to the first crush can 20 and the second crush can 22, e.g., in a cross-vehicle direction C. The first crush can 20 and the second crush can 22 each extend vehicle-rearwardly from the crossbeam 24 toward the first frame rail 16 and the second frame rail 18, respectively. The first crush can 20 and the second crush can 22 each extend from the crossbeam 24 along the vehicle-longitudinal axis L.

The crossbeam 24 includes a first portion 34 that is vehicle-forward of the first crush can 20 and a second portion 36 that is vehicle-forward of the second crush can 22. The crossbeam 24 includes a middle portion 38 extending from the first portion 34 to the second portion 36. The first portion 34, the middle portion 38, the second portion 36, the first crush can 20, and the second crush can 22 are unitary. "Unitary" means a single, uniform piece of material with no seams, joints, fasteners, or adhesives holding it together, i.e., the first portion 34, the middle portion 38, the second portion 36, the first crush can 20, and the second crush can 22 are formed together simultaneously as a single continuous unit, e.g., by extruding (as in the example in the Figures), machining from a unitary blank, molding, forging, casting, etc. Non-unitary components, in contrast, are formed separately and subsequently assembled, e.g., by threaded engagement, welding, etc. During certain vehicle impacts, the first portion 34, middle portion 38, and/or second portion 36 of the crossbeam 24 may transmit force to the first crush can 20 and/or the second crush can 22. Specifically, walls 40 of the lattice shape transmit certain impact force during certain vehicle impacts.

The crossbeam 24 has a first outermost surface 42 and a second outermost surface 44 and extends cross-vehicle between the first outermost surface 42 and the second outermost surface 44. The crossbeam 24 terminates at the first outermost surface 42 and the second outermost surface 44. The first outermost surface 42 and the second outermost surface 44 of the crossbeam 24 face in opposite directions, specifically vehicle-outboard in opposite directions. The first outermost surface 42 and the second outermost surface 44 are the outermost surfaces of the crossbeam 24 in the cross-vehicle direction. The first crush can 20 and the second crush can 22 each have an outermost surface. The outermost surface 46 of the first crush can 20 and the outermost surface 48 of the second crush can 22 face in opposite directions, specifically vehicle-outboard in opposite directions.

The crossbeam 24 includes a vehicle-forward surface 50 and a vehicle-rearward surface 52. The vehicle-forward surface 50 and the vehicle-rearward surface 52 are outermost surfaces of the cross beam. The vehicle-rearward surface 52 extends from the first crush can 20 to the second crush can 22. The vehicle-rearward surface 52 extends from the first outermost surface 42 to the second outermost surface 44. The vehicle-rearward surface 52 extends across the first portion 34 and the second portion 36 of the crossbeam 24.

The bumper 14 has a topmost surface 26 and a bottommost surface 28. The topmost surface 26 of the bumper 14 and the bottom most surface of the bumper 14 are both along the crossbeam 24, the first crush can 20, and the second crush can 22. The topmost surface 26 and/or the bottommost surface 28 may extend from the first outermost surface 42 of the crossbeam 24 to the second outermost surface 44 of the crossbeam 24. The topmost surface 26 and/or the bottommost surface 28 may extend from the vehicle-forward surface 50 of the crossbeam 24 to the vehicle-rearward surface 52 of the crossbeam 24. In the example shown in the Figures, the topmost surface 26 of the bumper 14 is generally planar from the vehicle-forward surface 50 of the crossbeam 24 to the vehicle-rearward surface 52 of the crossbeam 24 and along the first crush can 20 and the second crush can 22, and the bottommost surface 28 of the bumper 14 is generally planar from the vehicle-forward surface 50 of the crossbeam 24 to the vehicle-rearward surface 52 of the crossbeam 24 and along the first crush can 20 and the second crush can 22.

With reference to the example shown in FIGS. 1-3, the first crush can 20 may be spaced cross-vehicle from the first outermost surface 42 and the second crush can 22 may be spaced cross-vehicle from the second outermost surface 44. In such examples, the crossbeam 24 includes a first car 54 extending vehicle-outboard from the first crush can 20 and a second car 56 extending vehicle-outboard from the second crush can 22. Specifically, the first car 54 extends vehicle-outboard from the first portion 34 of the crossbeam 24 and the second ear 56 extends vehicle-outboard from the second portion 36 of the crossbeam 24. In such examples, the first car 54, the first portion 34, middle portion 38, the second portion 36, the second car 56, the first crush can 20, and the second crush can 22 are unitary. In examples including the first car 54 and the second car 56, during certain vehicle impacts, the first car 54 and the second car 56 may transmit force to the first crush can 20 and the second crush can 22, respectively. Specifically, walls 40 of the lattice shape transmit certain impact force during certain vehicle impacts. The first car 54 and the second car 56 may rotate and/or deform relative to the first crush can 20 and the second crush can 22, respectively, during certain vehicle impacts, e.g., certain impacts at the first car 54 and/or first portion 34 of the beam and certain impacts at the second car 56 and/or the second portion 36.

In the examples in FIGS. 4-9, the first crush can 20 and the second crush can 22 are aligned cross-vehicle with the first outermost surface 42 and the second outermost surface 44. Specifically, the outermost surface 46 of the first crush can 20 meets the crossbeam 24 at the first outermost surface 42 and extends from the first outermost surface 42 of the crossbeam 24 toward the first frame rail 16. Similarly, the outermost surface 48 of the second crush can 22 meets the crossbeam 24 at the second outermost surface 44 and extends from the second outermost surface 44 of the crossbeam 24 toward the second frame rail 18. In such examples, outermost surface 46 of the first crush can 20 and the first outermost surface 42 of the crossbeam 24 are colinear and the outermost surface 48 of the second crush can 22 and the second outermost surface 44 of the crossbeam 24 are colinear.

In the examples of FIGS. 4-9, the crossbeam 24 and the first crush can 20 and/or second crush can 22 may transmit force to the respective frame rail during certain vehicle impacts. As an example, during certain vehicle impacts at the first portion 34 of the crossbeam 24, force may be transmitted linearly from the first portion 34 of the crossbeam 24 and the first crush can 20 to the first frame rail 16. Similarly, during certain vehicle impacts at the second portion 36 of the crossbeam 24, force may be transmitted linearly from the second portion 36 of the crossbeam 24 and the second crush can 22 to the second frame rail 18.

In the example shown in FIGS. 4-6, the periphery of the first crush can 20 and the periphery second crush can 22 each widen from the crossbeam 24 to the frame rail. In the example shown in FIGS. 4-6, the first crush can 20 and the second crush can 22 have a truncated-rectangular pyramid shape widening from the crossbeam 24. In the example shown in FIGS. 4-6, force transmitted through from the first portion 34 of the crossbeam 24 and the first crush can 20 to the first frame rail 16 may be distributed in a cross-vehicle direction between the vehicle-forward surface 50 of the crossbeam 24 and the first frame rail 16, and force transmitted through from the second portion 36 of the crossbeam 24 and the second crush can 22 to the second frame rail 18 may be distributed in a cross-vehicle direction between the vehicle-forward surface 50 of the crossbeam 24 and the second frame rail 18.

In the example shown in FIGS. 7-9, the periphery of the first crush can 20 and the periphery of the second crush can 22 each narrow from the crossbeam 24 to the frame rail. In the example shown in FIGS. 7-9, the first crush can 20 and the second crush can 22 have a truncated-rectangular pyramid shape narrowing from the crossbeam 24. In the example shown in FIGS. 4-6, force transmitted through from the first portion 34 of the crossbeam 24 and the first crush can 20 to the first frame rail 16 may be concentrated in a cross-vehicle direction between the vehicle-forward surface 50 of the crossbeam 24 and the first frame rail 16, and force transmitted through from the second portion 36 of the crossbeam 24 and the second crush can 22 to the second frame rail 18 may be concentrated in a cross-vehicle direction between the vehicle-forward surface 50 of the crossbeam 24 and the second frame rail 18. As an example, force applied to the first portion 34 of the crossbeam 24 at a cross-vehicle position outboard of the frame rail may be transmitted to the frame rail through the first portion 34 of the crossbeam 24 and the first crush can 20, and force applied to the second portion 36 of the crossbeam 24 at a cross-vehicle position outboard of the frame rail 16, 18 may be transmitted to the frame rail 16, 18 through the second portion 36 of the crossbeam 24 and the second crush can 22.

As set forth above, the crossbeam 24, the first crush can 20, and the second crush can 22 have a lattice shape defining cells 30. The cells 30 are empty void filled with air. The lattice shape has walls 40 bounding the cells 30.

The crossbeam 24, the first crush can 20, and the second crush can 22 may be extruded material, e.g., extruded aluminum, extruded plastic, etc. "Extruded" is a structural description of the bumper 14, not the process by which the bumper 14 is made. In other words, the extruded bumper 14 has the structure of an extruded component. When extruded, the bumper 14 may be a single, uniform piece of material with no seams or joints formed after being extruded. In such an example, the bumper 14 has a shape that conforms to extrusion tooling, e.g., an extrusion tip and/or die, used to form the bumper 14 as an extruded component.

At least some of the cells 30 are elongated through both the topmost surface 26 and the bottommost surface 28. In the examples shown in the Figures, all of the cells 30 are elongated through the topmost surface 26 and the bottommost surface 28. The cells 30 extend along parallel axes A that extend through the topmost surface 26 and the bottommost surface 28. In the example shown in the Figures, each cell 30, respectively, has a constant cross-section from the bottommost surface 28 to the topmost surface 26. The cells 30 are open at the bottommost surface 28 and the topmost surface 26. In the examples shown in the Figures, the cells 30 have a rectangular cross-section.

The lattice shape has a repeating pattern that continues from the crossbeam 24 to the first crush can 20 and from the crossbeam 24 to the second crush can 22. The repeating pattern repeats cells 30 across the interface 58 between the crossbeam 24 and the first crush can 20 and/or second crush can 22. The pattern from the crossbeam 24 to the first crush can 20 and the second crush repeats in that the repeated cells 30 have common attributes. In the example shown in the Figures, the cells 30 of the crossbeam 24 adjacent the first crush can 20 and the second crush can 22 have the and cells 30 of the first crush can 20 and the second crush can 22 adjacent the crossbeam 24 have the same shape, size, and orientation. In some examples, as shown in the Figures and as described below, adjacent cells 30 may have different shapes and/or sizes, e.g., with a changing pattern of cells 30 in the first crush can 20 and the second crush can 22. In other examples, all cells 30 may have a common shape, size, and/or orientation.

At least a portion of the first crush can 20 and/or a portion of the second crush can 22 increases in stiffness along a direction from the crossbeam 24 toward the first frame rail 16/second frame rail 18, respectively. The first crush can 20 may be stiffer at the first frame rail 16 than at the crossbeam 24, and the second crush can 22 may be stiffer at the second frame rail 18 than at the crossbeam 24. "Stiffer" means more rigid, i.e., more resistant to deformation. In some examples, the first crush can 20 and/or the second crush can 22 each continuously increase in stiffness from the crossbeam 24 to the first frame rail 16/second frame rail 18, respectively.

In each of the examples in FIGS. 1-9, the walls 40 increase in thickness in a direction from the crossbeam 24 toward the first frame rail 16/second frame rail 18, respectively, to increase the stiffness. Specifically, the walls 40 in the examples in the Figures increase in thickness in a cross-vehicle direction in a direction from the crossbeam 24 toward the first frame rail 16/second frame rail 18, respectively. In the examples shown in the Figures, the walls 40 begin to increase in thickness about two-thirds of the distance from the crossbeam 24 to the first frame rail 16/second frame rail 18, respectively. In other examples, the walls 40 of the first crush can 20 and second crush can 22 may begin to increase in thickness at any suitable position between the crossbeam 24 and the first frame rail 16/second frame rail 18, respectively, including at the interface 58.

In each of the examples in FIGS. 1-9, successive ones of the walls 40 in a direction from the crossbeam 24 toward the first frame rail 16/second frame rail 18, respectively, increase the thickness. In other words, successive ones of the walls 40 that are elongated cross-vehicle may increase in thickness relative to adjacent walls 40 that are elongated cross-vehicle. Specifically, the successive walls 40 in the examples in the Figures increase in thickness relative to adjacent walls 40 in a direction along the vehicle-longitudinal axis L. In the examples shown in the Figures, the walls 40 begin to increase in thickness about two-thirds of the distance from the crossbeam 24 to the first frame rail 16/second frame rail 18, respectively. In other examples, the walls 40 of the first crush can 20 and second crush can 22 may begin to increase in thickness at any suitable position between the crossbeam 24 and the first frame rail 16/second frame rail 18, respectively, including at the interface 58.

In at least the portion of the lattice shape, successive ones of the cells 30 decrease in size in the direction from the crossbeam 24 toward the first frame rail 16/second frame rail 18, respectively, as shown in the examples in FIGS. 1-9. The decreased size may increase stack-up in the event the cells 30 crush, which increases stiffness. In at least a portion of the lattice shape, successive ones of the cells 30 may consecutively decrease in size. In the examples shown in the Figures, the cells 30 begin to decrease in size about two-thirds of the distance from the crossbeam 24 to the first frame rail 16/second frame rail 18, respectively. In other examples, the walls 40 of the first crush can 20 and second crush can 22 may begin to decrease in size at any suitable position between the crossbeam 24 and the first frame rail 16/second frame rail 18, respectively, including at the interface 58.

The bumper 14 is supported by the vehicle frame 12, i.e., the weight of the bumper 14 is borne by the vehicle frame 12. The bumper 14 assembly may be a front bumper 14 assembly, as shown in the Figures. In other words, the bumper 14 assembly may be at a front of the vehicle 10 and, in such examples, the bumper 14 extension is operable for frontal collisions of the vehicle 10.

The bumper 14 may be connected directly to first frame rail 16 and the second frame rail 18. As an example, the bumper 14 includes a first flange 60 extending radially from the first crush can 20 and a second flange 62 extending radially from the second crush can 22. In such an example, the first flange 60 abuts the first frame rail 16 and the second flange 62 abuts the second frame rail 18. Fasteners 66 may extend through the flanges 60, 62 and into the frame rails 16, 18. The fasteners 66 may be, for example, screws, bolts, pins, etc. In examples including fasteners 66, the flange 60, 62 may include mounting holes 64 that extend through the flange 60, 62 along the vehicle-longitudinal axis Ls. The first flange 60 and the first crush can 20 may be unitary and the second flange 62 and the second crush can 22 may be unitary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising;
a vehicle frame including a first frame rail and a second frame rail each elongated along a vehicle-longitudinal axis; and
a bumper supported by the first frame rail and the second frame rail;
the bumper including a crossbeam elongated cross-vehicle;

the bumper including a first crush can and a second crush can;
the first crush can extending vehicle-rearward from the crossbeam to the first frame rail along the vehicle-longitudinal axis and the second crush can extending vehicle-rearward from the crossbeam to the second frame rail along the vehicle-longitudinal axis;
the bumper having a topmost surface along the crossbeam, the first crush can, and the second crush can and a bottommost surface along the crossbeam, the first crush can, and the second crush can;
the crossbeam, the first crush can, and the second crush can having a lattice shape defining cells, at least some of the cells being elongated through both the topmost surface and the bottommost surface;
the lattice shape having walls bounding the cells;
in at least a portion of the lattice shape, the walls increasing in thickness in a direction from the crossbeam toward the frame rail;
the crossbeam, the first crush can, and the second crush can being unitary with each other; and
the crossbeam, the first crush can, and the second crush can being extruded aluminum.

2. The vehicle as set forth in claim 1, wherein at least a portion of the first crush can and the second crush can increases in stiffness along a direction from the crossbeam toward the frame rail.

3. The vehicle as set forth in claim 1, wherein the first crush can and the second crush can each continuously increase in stiffness from the crossbeam to the frame rail.

4. The vehicle as set forth in claim 1, wherein a periphery of the first crush can and a periphery of the second crush can each narrow from the crossbeam to the frame rail.

5. The vehicle as set forth in claim 1, wherein a periphery of the first crush can and a periphery of the second crush can each widen from the crossbeam to the frame rail.

6. The vehicle as set forth in claim 1, wherein in at least the portion of the lattice shape, successive ones of the cells decrease in size in the direction from the crossbeam toward the frame rail.

7. The vehicle as set forth in claim 6, wherein a periphery of the first crush can and a periphery of the second crush can each narrow from the crossbeam to the frame rail.

8. The vehicle as set forth in claim 6, wherein a periphery of the first crush can and a periphery of the second crush can each widen from the crossbeam to the frame rail.

9. The vehicle as set forth in claim 6, wherein:
the lattice shape has a repeating pattern that continues from the crossbeam to the first crush can and from the crossbeam to the second crush can;
the crossbeam extends cross-vehicle between a first outermost surface and a second outermost surface;
the first crush can having an outermost surface extending from the first outermost surface of the crossbeam toward the first frame rail; and
the second crush can having an outermost surface extending from the second outermost surface of the crossbeam toward the second frame rail.

10. The vehicle as set forth in claim 9, wherein:
the bumper includes a first flange extending radially from the first crush can and a second flange extending radially from the second crush can, the first flange abutting the first frame rail and the second flange abutting the second frame rail; and
the first flange is unitary with the first crush can and the second flange is unitary with the second crush can.

11. The vehicle as set forth in claim 10, further comprising fasteners extending through the first flange into the first frame rail and fasteners extending through the second flange into the second frame rail.

12. The vehicle as set forth in claim 1, wherein in at least a portion of the lattice shape, successive ones of the cells decrease in size in a direction from the crossbeam toward the frame rail.

13. The vehicle as set forth in claim 1, wherein the bumper includes a first flange extending radially from the first crush can and a second flange extending radially from the second crush can, the first flange abutting the first frame rail and the second flange abutting the second frame rail.

14. The vehicle as set forth in claim 13, further comprising fasteners extending through the first flange into the first frame rail and fasteners extending through the second flange into the second frame rail.

15. The vehicle as set forth in claim 13, wherein the first flange is unitary with the first crush can and the second flange is unitary with the second crush can.

16. The vehicle as set forth in claim 1, wherein the lattice shape has a repeating pattern that continues from the crossbeam to the first crush can and from the crossbeam to the second crush can.

17. The vehicle as set forth in claim 1, further comprising a fascia supported by the vehicle frame and including a class-A surface, the bumper being between the fascia and the vehicle frame.

\* \* \* \* \*